United States Patent
Batarseh et al.

(10) Patent No.: US 6,594,158 B2
(45) Date of Patent: *Jul. 15, 2003

(54) AC/DC CONVERTER WITH POWER FACTOR CORRECTION (PFC)

(75) Inventors: Issa Batarseh, Oviedo, FL (US); Peter Kornetzky, Ilmenau (DE); Huai Wei, Plano, TX (US)

(73) Assignee: University of Central Florida, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/764,174

(22) Filed: Jan. 17, 2001

(65) Prior Publication Data

US 2001/0046146 A1 Nov. 29, 2001

Related U.S. Application Data

(60) Provisional application No. 60/176,608, filed on Jan. 18, 2000.

(51) Int. Cl.$^7$ .............................................. H02M 3/335
(52) U.S. Cl. ............................ 363/16; 363/37; 323/222
(58) Field of Search ..................... 307/110; 363/59–62, 363/16, 89, 97, 127, 131, 37; 323/222

(56) References Cited

U.S. PATENT DOCUMENTS

| | | | |
|---|---|---|---|
| 4,533,986 A | 8/1985 | Jones | 363/17 |
| 5,224,025 A | 6/1993 | Divan et al. | 363/16 |
| 5,416,387 A | 5/1995 | Cuk et al. | 315/290 R |
| 5,442,539 A | 8/1995 | Cuk et al. | 363/89 |
| 5,461,301 A | 10/1995 | Truong | 323/207 |
| 5,479,331 A | 12/1995 | Lenni | 363/21 |
| 5,510,974 A | 4/1996 | Gu et al. | 363/134 |
| 5,515,257 A | 5/1996 | Ishii | 363/21 |
| 5,559,688 A | 9/1996 | Pringle | 363/89 |
| 5,581,454 A | * 12/1996 | Collins | 363/59 |
| 5,592,128 A | 1/1997 | Hwang | 331/61 |
| 5,594,629 A | 1/1997 | Steigerwald | 363/21 |
| 5,598,326 A | 1/1997 | Liu et al. | 363/34 |
| 5,600,546 A | 2/1997 | Ho et al. | 363/21 |
| 5,608,614 A | * 3/1997 | Ohnishi et al. | 307/110 |
| 5,619,404 A | 4/1997 | Zak | 363/21 |
| 5,734,562 A | 3/1998 | Redl | 363/16 |
| 5,959,849 A | * 9/1999 | Batarseh et al. | 323/222 |

* cited by examiner

Primary Examiner—Michael Sherry
Assistant Examiner—Gary L. Laxton
(74) Attorney, Agent, or Firm—Brian S. Steinberger; Law Offices of Brian S. Steinberger, P.A.

(57) ABSTRACT

One-stage power factor correction (PFC) with output electrical isolation. Two types of PFC converters are proposed here: 1) Multi stage capacitive-switching network low voltage PFC converter and 2) two-switch soft switching PFC converters. This resulted in a near unity power factor AC-DC converter with low voltage output. The second converter uses the power switch in combination with a grounded auxiliary switch to produce soft-switching converter to operate in high switching frequencies. Due to its simplified power stage and control circuit, this converter presents a variety of benefits including better efficiency (87%), lower cost, higher reliability, increased operating frequencies into the hundreds of kilo-hertz range and low operating voltages of less than 5 volts. With PSPICE simulation and experimental results, a measured power factor of 0.99 was obtained by the single switch converter.

10 Claims, 12 Drawing Sheets

AC/DC CONVERTER WITH POWER FACTOR CORRECTION (PFC)

This invention relates to AC to DC converters and claims the benefit of priority to U.S. Provisional Patent Application No. 60/176,608 titled "IMPROVED AC/DC CONVERTER WITH POWER FACTOR CORRECTION" filed Jan. 18, 2000 and is funded in part by NASA STTR Contract No.: NAS 10-98064.

BACKGROUND AND PRIOR ART

Conventional single-phase rectifier power electronic circuits suffer from high total harmonic distortion (THD) and poor power factor. A number of regulations have been enacted recently to control the harmonic content of line current drawn by the electronic equipment. As a result, researchers have been actively seeking development of power supplies, which can comply with those regulations. In recent years, many circuits and control methods were reported, in which high-frequency switching techniques were used to shape the input current waveform which becomes dominate in power factor correction (PFC). See for example: A. Prasada. P. D. Ziogas and S. Manias. "A Novel Passing Waveshaping Method for Single-Phase Diode Rectifiers." PESC'89. pp. 99–105; L Barbi and S. A. Oliveira da Silva. "Sinusoidal Line Current Rectification at Unity Power Factor with Boost Quasi-resonant Converters." In Proceedings of IEEE-APE'90, pp. 553–562; and, P. Kornetzky, H. Wei and L Batarseh. "A Novel One-Stage Power Factor Correction Converter," IEEE APEC'97 Proc., pp. 251–258.

The implementation of high frequency techniques can be classified into two categories, ie. two-stage scheme and one-stage scheme. In a two-stage scheme, an ac/dc converter with power factor correction is connected to the line followed by a dc/dc converter. These two power stages can be controlled separately, and thus it makes both converters possible to be optimized. The drawbacks of this scheme is lower efficiency due to twice processing of the input power, larger control circuits, higher cost and low reliability.

A one-stage scheme combines the PFC circuit and power conversion circuit in one stage. Due to its simplified power stage and control circuit, this scheme is potentially more efficient. The underline strategy of this scheme is to design the circuit in a certain way that allows its PFC circuit and power conversion circuit to share the same power switch. Several PFC circuits have been reported. See for example: C. Cansem and L Barbi. "A Unity of Power Factor Multiple Isolated Outputs Switching Mode Power Supply Using A Single Switch." APEC'91. pp. 430–436. These circuits are especially attractive in low cost, low power applications. However, some drawbacks still exist: a) owing to improperly sharing of the power switch, when the converter operates at high frequency, the unavoidable leakage inductance of their power transformers produce high voltage spike at the switching time resulting in decreased efficiency; b) because the power switch performs both PFC and regulation purposes, their regulation capabilities are limited; and, c) at high current and low duty ratio operation, a high voltage presents on the bulk capacitor, resulting in a high rating in design and hence raising the cost. Recently, several single switch converter topologies have been presented to overcome the above drawbacks. See for example: P. Kornetzky. H. Wei and I. Bartarseh. "A Novel One-Stage Power Factor Correction Converter." IEEE APEC '97 Proc. pp. 251–258; and, Y. S. Lee, IC W. Sui and B. T. Lin, "Single-Stage Isolated Power-Factor-Corrected Power Supplies with Regenerative Clamping." IEEE APEC '97 Proc. pp. 259–265

U.S. Patents have been recently issued for AC/DC converters with power factor correction but fail to overcome all problems presented above. See for example. U.S. Pat. No. 5,224,025 to Divan et al; U.S. Pat. No. 5,416,387 and U.S. Pat. No. 5,442,539 to Oat et al; U.S. Pat. No. 5,479,331 to Lenni; U.S. Pat. No. 5,510,974 to Gu et al; U.S. Pat. No. 5,515,257 to Ishii: U.S. Pat. No. 5,559,688 to Pringle; U.S. Pat. No. 5,592,128 to Hwang; U.S. Pat. No. 5,594,629 to Steigerwald: U.S. Pat. No. 5,598,326 to Liu et al; U.S. Pat. No. 5,600,546 to Ho et al; and, U.S. Pat. No. 5,619,404 to Zak.

Our recently issued U.S. Pat. No. 5,959,849 dated Sep. 28, 1999 does overcome most of the problems by teaching an AC to DC converter which combines a boost circuit, a Pulse Width Modulation (PWM) switching regulator and a forward circuit power stage in which two storage capacitors are used to relieve the voltage spike produced by the power transformer and to provide energy to the output when the AC line voltage crosses zero. Unfortunately, the rapid evolution of computers and similar digital devices have required power supplies of voltages less than 5 volts and those that function in the hundreds of kilo-herz environments without severe energy losses and resultant failures.

SUMMARY OF THE INVENTION

The first objective of the present invention is to provide a switching power supply that operates from AC line voltage having a high power factor and output isolation.

The second objective of this invention is to provide a mechanism for soft-switching to allow for a one-stage power factor correction in an AC to DC converter operating in the hundreds of kilo-hertz.

The third objective of this invention is to provide an AC to DC converter having an output transformer that allows the converter to be used for single output and multi-output applications in the low voltage range.

The fourth objective of this invention is to provide an AC to DC converter where the leakage inductance of the forward mode power transformer will not cause an additional voltage stress at the power switch so that a power switch having a lower voltage rating and less power dissipation can be used.

The preferred embodiment of the AC to DC converters with PFC according to this invention is a power supply that provides a DC power to a load from an AC source comprising: a rectifying stage for transferring electrical energy from an AC source into pulsating unipolar voltage pulses at output terminals;

A boost stage having a controllable conducting means and a first unidirectional conduction means for controlling current flow from the output terminals of the rectifying state and blocking the current flow into the opposite direction and a single controllable switching device connected across the output terminals and more than one inductive-capacitive stages preferably two connected between said boost stage and said forward stage providing an inductive energy storing circuit when said switching device is closed and a capacitive charging circuit when said switching device is open, whereby a conversion efficiency of over approximately 75% AC to DC is achieved and with outlet voltage of approximately five volts and lower on alternatively a power on and off switch and an on and off auxiliary switch for controlling both the PFC circuit means and the AC to DC power conversion circuit means, wherein the converter operates at a frequency of greater than about 500 kilo-hertz.

Further objects and advantages of this invention will be apparent from the following detailed description of a presently preferred embodiment, which is illustrated, schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

This invention relates to U.S. Pat. No. 5,959,849, issued: Sep. 28, 1999 to the same inventors and same assignee as the subject invention, which is incorporated by reference and which claims the benefit of priority to U.S. Provisional Patent Application No. 60/050,476 filed Jun. 23, 1997.

Figure 1:
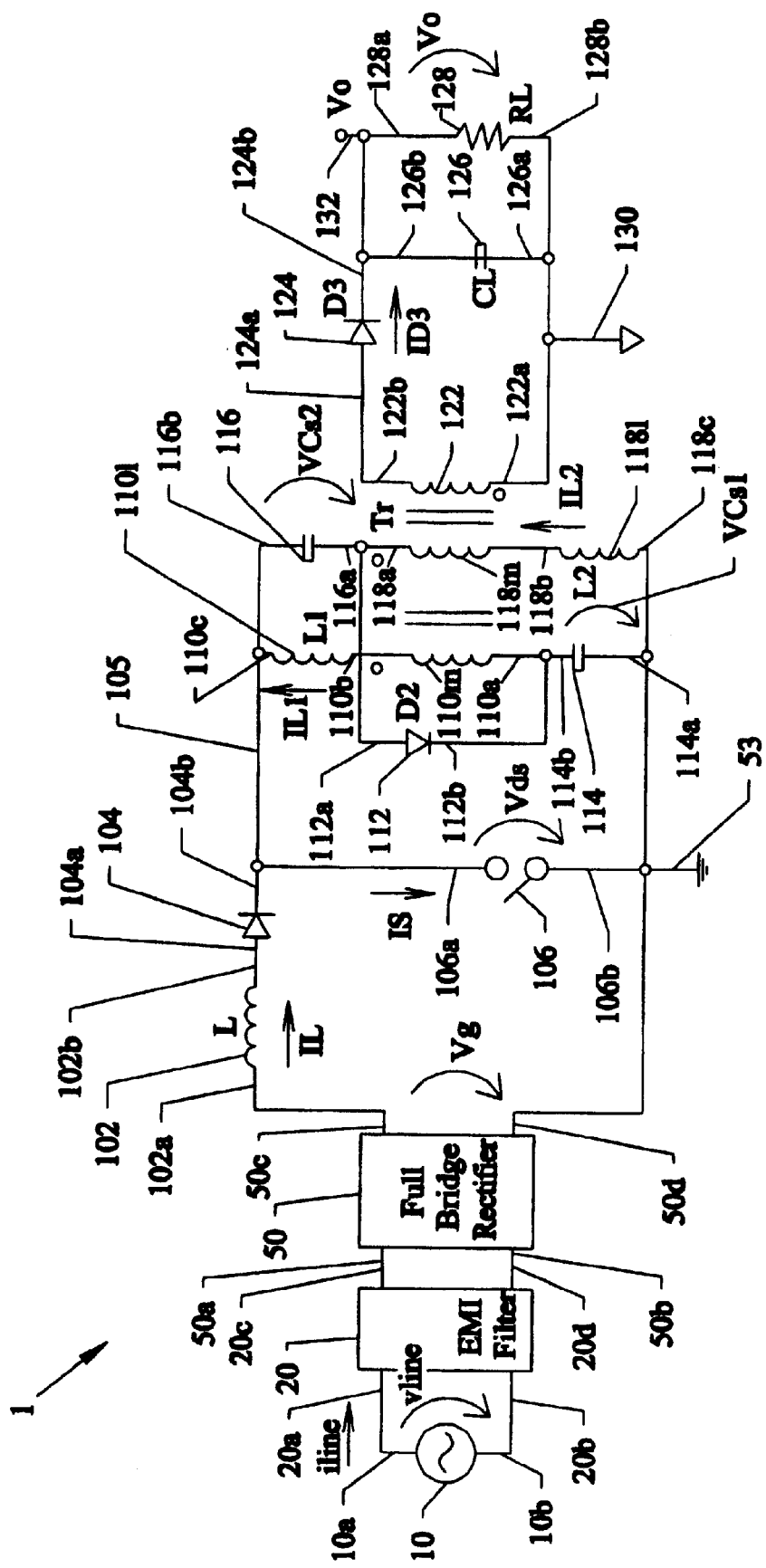
FIG. 1 is a schematic of the AC to DC converter disclosed and claimed in our U.S. Pat. No. 5,959,849 issued Sep. 28, 1999.

In our disclosure of the U.S. Provisional Application Serial No. 60/176,608, several novel converter topologies are set forth which are improvements over the converter topology that has been covered in our previously referenced U.S. Pat. No. 5,959,849 and set forth therein as FIG. 1. By this reference to U.S. Pat. No. 5,959,849, it is considered that its' text is incorporated fully herein. FIG. 1 disclosed therein is a single-switch, 106, converter with Power Factor Correction utilizing a DCM boost circuit as the input stage to provide PFC and a forward circuit as an output staffs to provide electrical isolation. Two storage capacitors, 114 and 116, have been employed to enhance the PFC capability of the boost circuit and to relieve the voltage spike produced by the power transformer, 118. The voltages across the storage capacitors, 114 and 116, are kept at lower levels. The converter has enough line regulation capability to be applied to a universal input.

Referring to FIG. 1, converter 1 includes voltage supply VAC. 10, which can be alternating voltage or current line, that provides sinusoidal voltage with rms value of approximately 120 Volts or another value with a line frequency of approximately 60 Hz. and the like. Output terminals of voltage supply 10, 10a and 10b are connected to input terminals 20a and 20b of any type of an electro magnetic interference (EMI) filter 20. EMI filter 20 includes storage devices that attenuates high transients of current passing terminals 2c and 20d on the way to the terminals 10a and 10b of voltage supply VAC. Output terminals of EMI filter 20, 20c and 20d are connected to the input terminals 50a and 50b of a line rectifier 50 of a conventional type such as KBL06 or any other type consisting of a bridge arrangement of unidirectional conducting devices such as semiconductor diodes in a way that positive voltage of output of line rectifier is delivered to terminal 50c connected to ground level 53 of boost/forward (primary) stage 53. Terminal 50c is connected to terminal 102a of an inductive device L. 102, having a value of approximately 420 μH, and the like.

Terminal 102b is connected to terminal 104a of a unidirectional conducting device D1, 104 such as a fast acting semiconductor diode such as MUR850, and the like. Output terminal of D', 104b is connected positive terminal 106a of a controllable switching device 106, such as a solid state switch such as power MOSFET Type IRF740 or another type of a switching device, and the like. Negative terminal of switching device 106b is connected to ground level 53. Switching device 106 switches on and off with a frequency higher than line frequency and with a ratio of an on and off time that is processed from output voltage at terminal VO, 132 with respect to output ground, 130 is kept constant within small limits. While switching device S, 106 is on. Inductive device L, 102 receives energy from voltage supply VAC,m 10 via EMI filter 20 and line filter 50. While switching device S 106 is off, energy stored in inductive device L, 102 is mainly transferred to the capacitive devices CS2, 116 and CS1, 114 via the chain D1, 104, and CS2, 116 and D2, 112 and CS1, 114 and terminal 50d and terminal 50c to terminal 102a of inductive device L, 102. The capacitances of capacitive devices CS1, 114 and CS2, 116 have a value of approximately 820 μF that is great enough to keep the voltages VCS1 and VCS2 across capacitive devices CS1m 114 and CS2, 116 constant within small limits at a value that is always greater than peak value of voltage supply VAC. 10 during normal operation. D2 is a unidirectional conducting device such as a fast acting semiconductor diode such as V336X and the like. This mode of operation is alike a boost converter and shapes the average current drawn from the power supply VAC. 10 to be of the same shape like the voltage Vline across the power supply VAC. 10. Referring to FIG. 1, forward mode transformer TR 100 consists of two primary windings 110m and 118m with equal turn numbers and secondary winding 122. The turn ratio of windings 110:118:122 is approximately 1:1:0.4. Furthermore leakage inductors L1, 108 and L2, 120, have a value of approximately 260 µH (each) and the like, in serial to primary windings 110m and 118m respectively.

Referring to FIG. 1. storage capacitors CS1, 114 and CS2, 116 are connected to the primary part of forward mode transformer TR, 100 as follows: Terminal 114a of capacitive device CS1, 114 and terminal 118c of leakage inductance L2. 118 are connected ground 53. Terminal 114b of capacitive device CS1, 114 and terminal 112b of unidirectional conducting device are connected together with terminal 110a of primary winding 110m. Terminal 116a of capacitive device CS1, 116 and terminal 112a of unidirectional conducting device are connected together with terminal 118a of primary winding 118m. Terminal of 110c of leakage inductance L1, is connected to terminal 116b of capacitive device CS2, 116 and to terminal 106a of switching device 106. The terminals 110b, 118a and 122a of forward mode transformer are marked with a dot. They are marked as the beginning of the windings; this means that they always have the same polarity with respect to the terminals 110a, 118b and 122b. While switching device S, 106, is on energy is transferred from the capacitive devices CS1, 114 and CS2, 116 to the secondary winding 122 of forward mode transformer TR, 100. While this happens part of the energy stored in the capacitive devices CS1, 114 and CS2, 116 is also stored in the leakage inductors L2, 110 and L2, 418. These two inductors act as a current limiter for energy transfer. If switching device S, 106, is off, energy stored in the leakage inductors L1, 110 and L2, 118 is fed back into the storage devices CS2, 116 and CS1, 114 as well as into the secondary winding, 122 of forward mode transformer TR, 100. The secondary winding 122 can be completely isolated from the primary side. RL represents the resistive part of a possible load between the output terminal VO, 132 of converter and output ground 130. Secondary winding 122 and uniconducting device D3, 124 can be an unidirectional conducting device such as a fast acting semiconductor diode such as MUR850 and the like. Components 122, 124 and capacitive device CL, 126 form a closed loop, where current flow is only allotted towards terminal 124b of semi conducting device D3. Terminals 122a of secondary winding 122 and negative terminal 126a of capacitive device CL are connected to output ground level. Capacitive device CL has a value of approximately 900 µF, that keeps output voltage VO constant within small limits while current ID3 of uniconducting device D3, 124 is not equal to load current IL.

Figure 2:
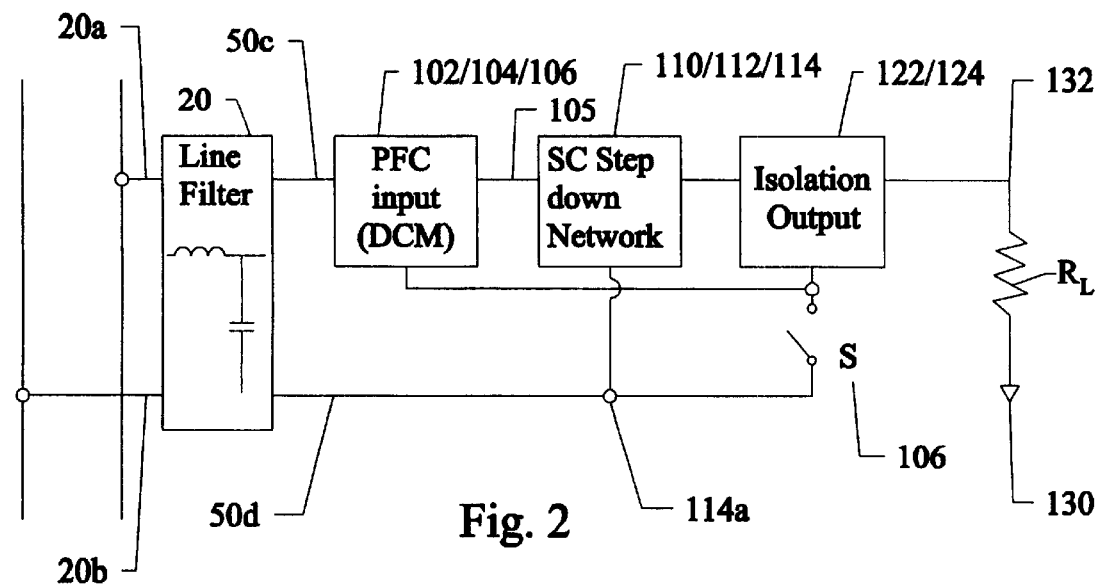
FIG. 2 is a simplified block diagram of the AC/DC low-voltage output converter.

Based on the block diagram of FIG. 2 four new and improved versions of FIG. 1 were subsequently developed and disclosed as shown below:

1) Low-Output Voltage AC/DC Converter with PFC Capabilities

This is a single switch AC/DC PFC isolation converter with low-voltage output. The main idea in constructing a low-voltage converter is insertion of such a switched-capacitor step-down network, (110/112/114), in between the input PFC circuit (102/104'106) and the output circuit, (112/24) shown in FIG. 2. i.e., more than 1, from 2 to 5 and preferably a total of 4 switched-capacitor step-down networks.

The input circuit, 20a, 20b, can still remain a boost circuit (102/104/106) operating in DCM to provide near unity input power factor and a dc bus voltage. The switched-capacitor network converts the higher bus voltage to lower level dc voltage when the switch, 106, is turned on to drive the forward output circuit. Large conversion ratio comes from three approaches: duty ratio control, switched-capacitor step-down network and step-down transformer. It should be noted that the three stages of the converter can share the same power switch.

Figure 3:
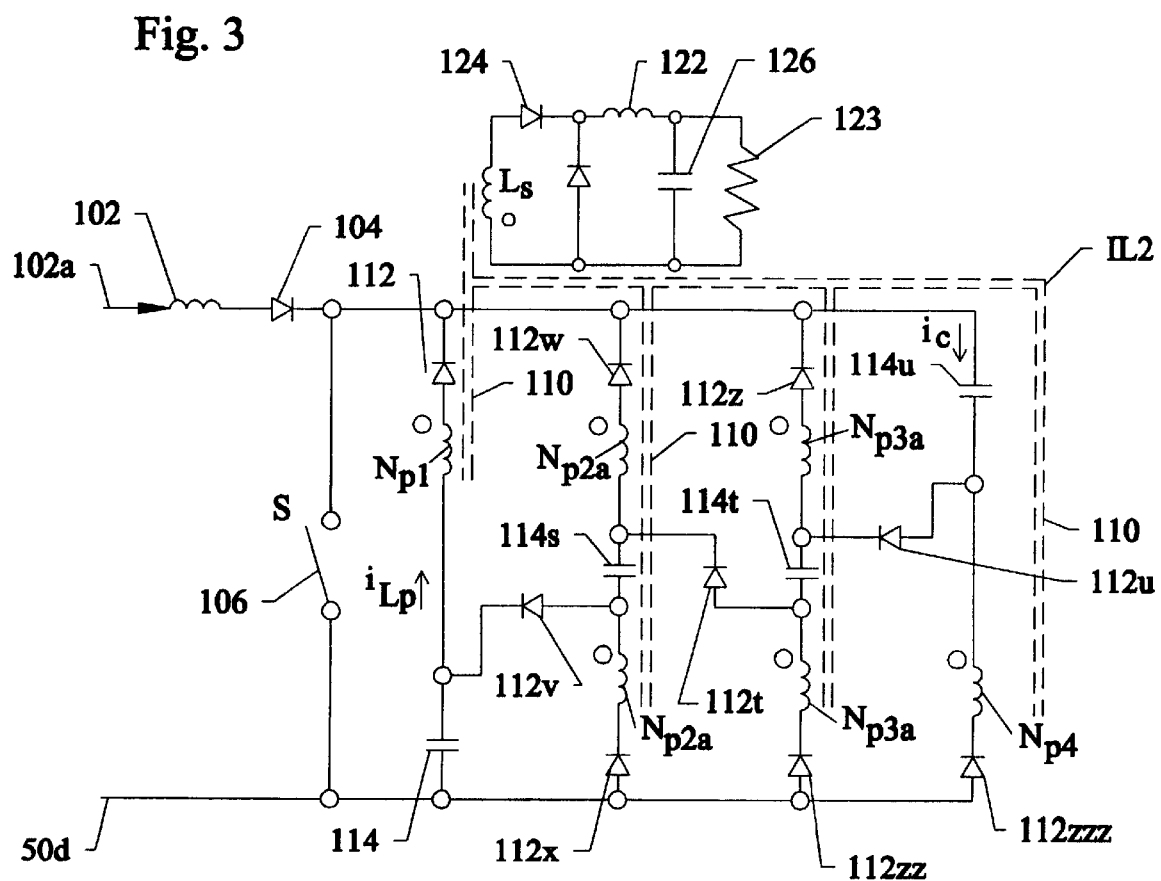
FIG. 3 is the circuit of an AC/DC converter with four-stage switched-capacitor network.

FIG. 3 shows the proposed converter topology with four-stage step-down switched capacitor network. The forward transformer has four equal-turn primary-windings ($N_{p1}=N_{p2a}+N_{p2b}=N_{p3a}+N_{p3b}=N_{p4}=N_p$), 110, with each of them being connected to one of the capacitors. In order to have equal voltage on the storage capacitors $C_1$, 114, $C_2$, 114s, $C_3$, 114t, and $C_4$, 114u, each primary winding in the inner branches has been divided into two parts. Note that more stages can be used when even low output voltage is desired.

An example 15W-50W 50 kHz converter, was built in the laboratory. The experimental prototype was designed with a 4-stage switched-capacitor network (m=4), 110, 112, 114s. The transformer, 1L2, turn-ratio n=5 was selected. In the construction of the prototype, the following components were used:

input choke L: 450 µH. MPP core, identified as 102

Diodes $D_1$, $D_{21}$, $D_{32}$ and $D_{43}$: MUR840, identified as 112, 112s 112t, 112u, respectively Diodes $D_{21}$, $D_{2a}$, $D_{2b}$, $D_{3a}$, $D_{3b}$ and $D_4$: EGP50GL, identified as 112v, 112w, 112x, 112z, 112zz, 112zzz respectively.

Main switch S: IRFP460, identified as 106.

Output rectifier switches $S_{01}$ and $S_{02}$: F101ON

Forward transformer T: Philips 3C85 ETD-PST39

Storage capacitor $C_1$, $C_2$, $C_3$ and $C_4$:390 µF/180V identified as 114, 114s, 114t, 114u respectively.

Output capacitor $C_o$: 470 µF/10V identified as 126.

Output inductor $L_O$: 100 µH, MPP core identified as 122.

PWM IC chip: UC3525A, contains 106.

The results of the operation with an input voltage of 110 volts @60 Hz were the following output values: $V_o$=3.3V±0.5%; Nominal output power: $P_{o.nom}$=30W; Output power range: 10W-50W; and, Switching frequency: $f_s$=50 kHz.

Figure 4:
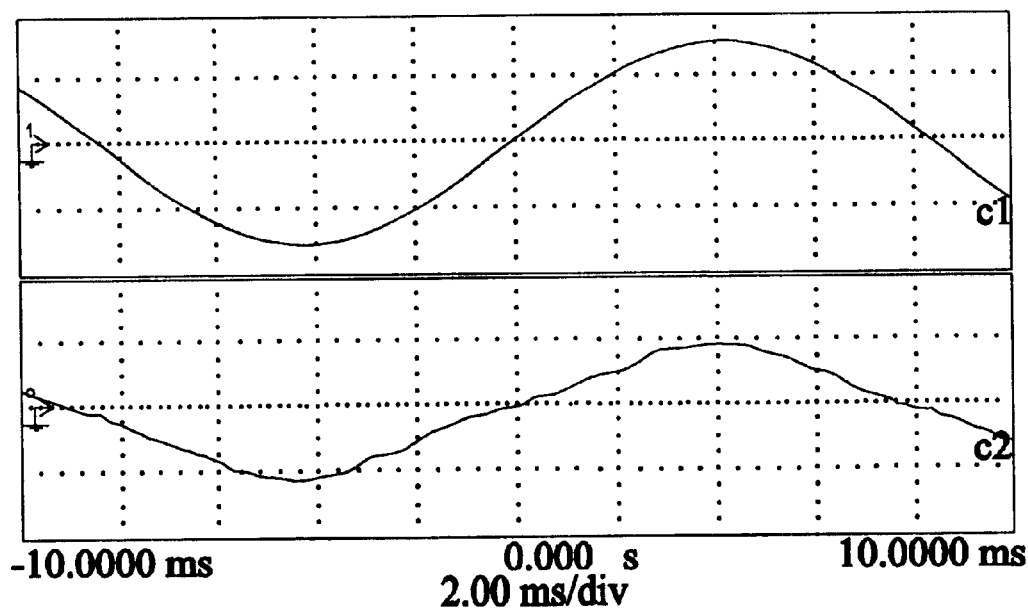
FIG. 4 shows experimental line voltage (upper, 100V/div.) and line current (lower, 1A/div.) waveforms
Figure 5:
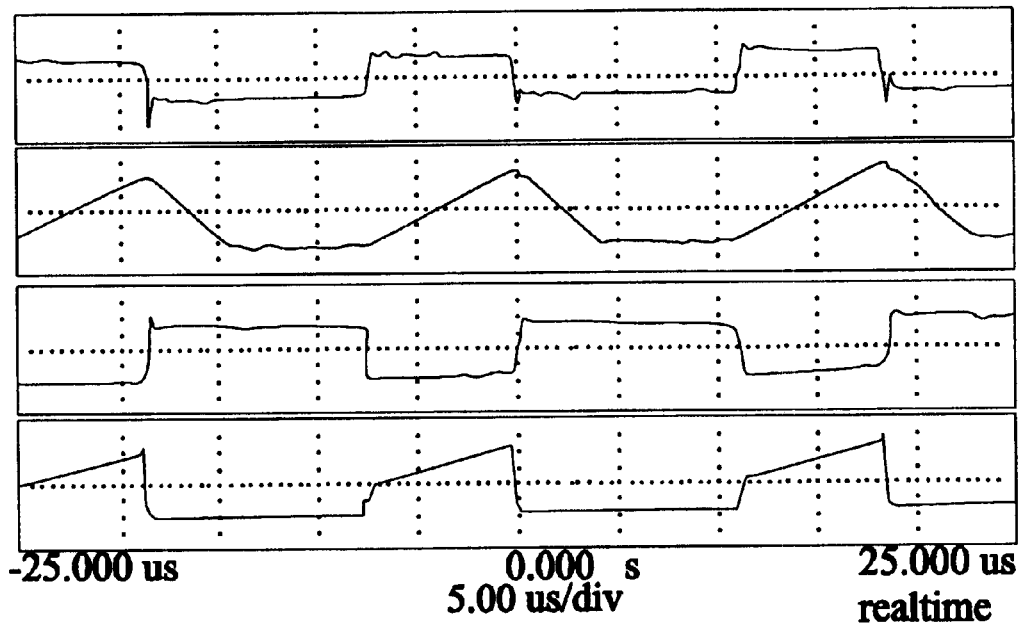
FIG. 5 shows experimental waveforms under 110VAC input and 8A output (from top, trace 1: gate signal for the power switch; trace 2: input inductor current, 2A/div.; trace 3: drain-source voltage of power switch, 400V/div.; trace 4: drain current of power switch, 4A/div.)

Experimental waveforms were recorded by hp54542A oscilloscope. FIG. 4 shows the filtered input current waveform over line cycle. It can be seen that the input current follows the sinusoidal line voltage very well, implying high power factor at the line side. The detailed input inductor current, drain to source switch voltage and switch current are shown in FIG. 5. The waveforms were recorded at the peak line voltage. It can be seen that the waveforms agree very well with the theoretical waveforms and the simulated waveforms.

Figure 6:
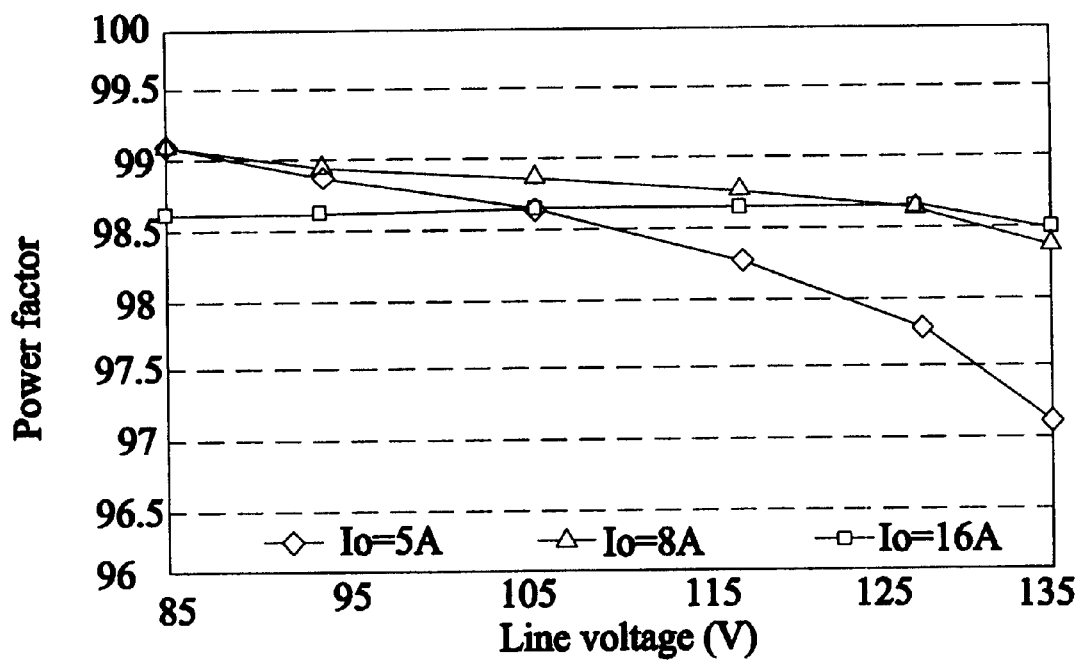
FIG. 6 shows measured power factor of the AC/DC converter of FIG. 3.
Figure 7:
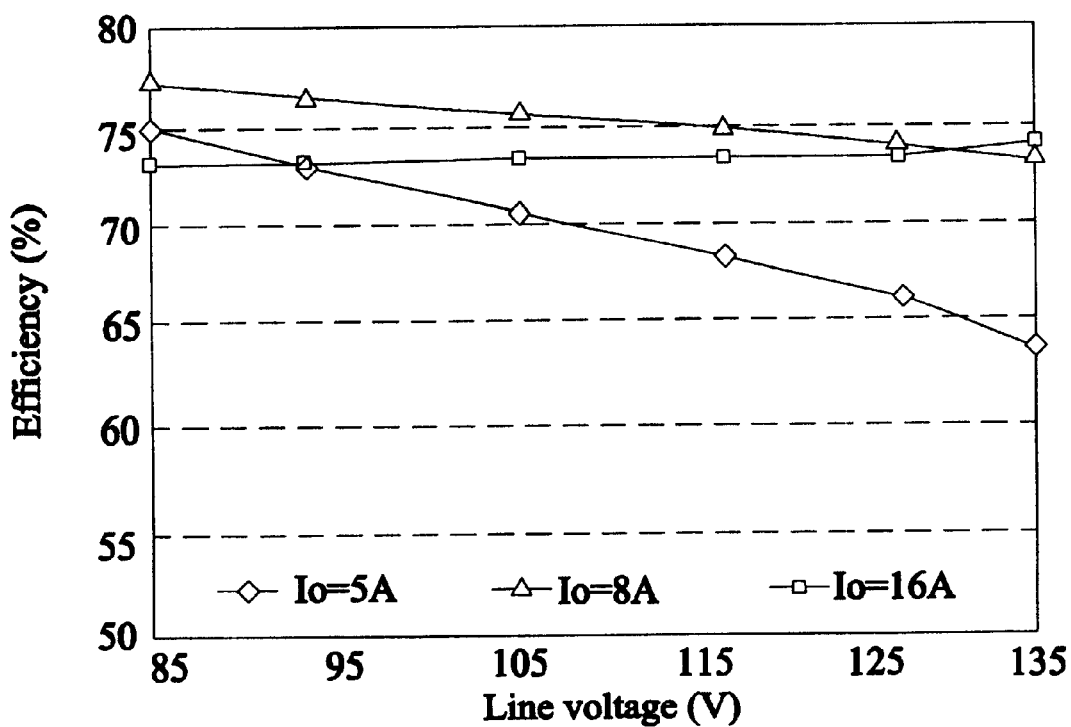
FIG. 7 shows measured efficiency of the AC/DC converter of FIG. 3.
Figure 8:
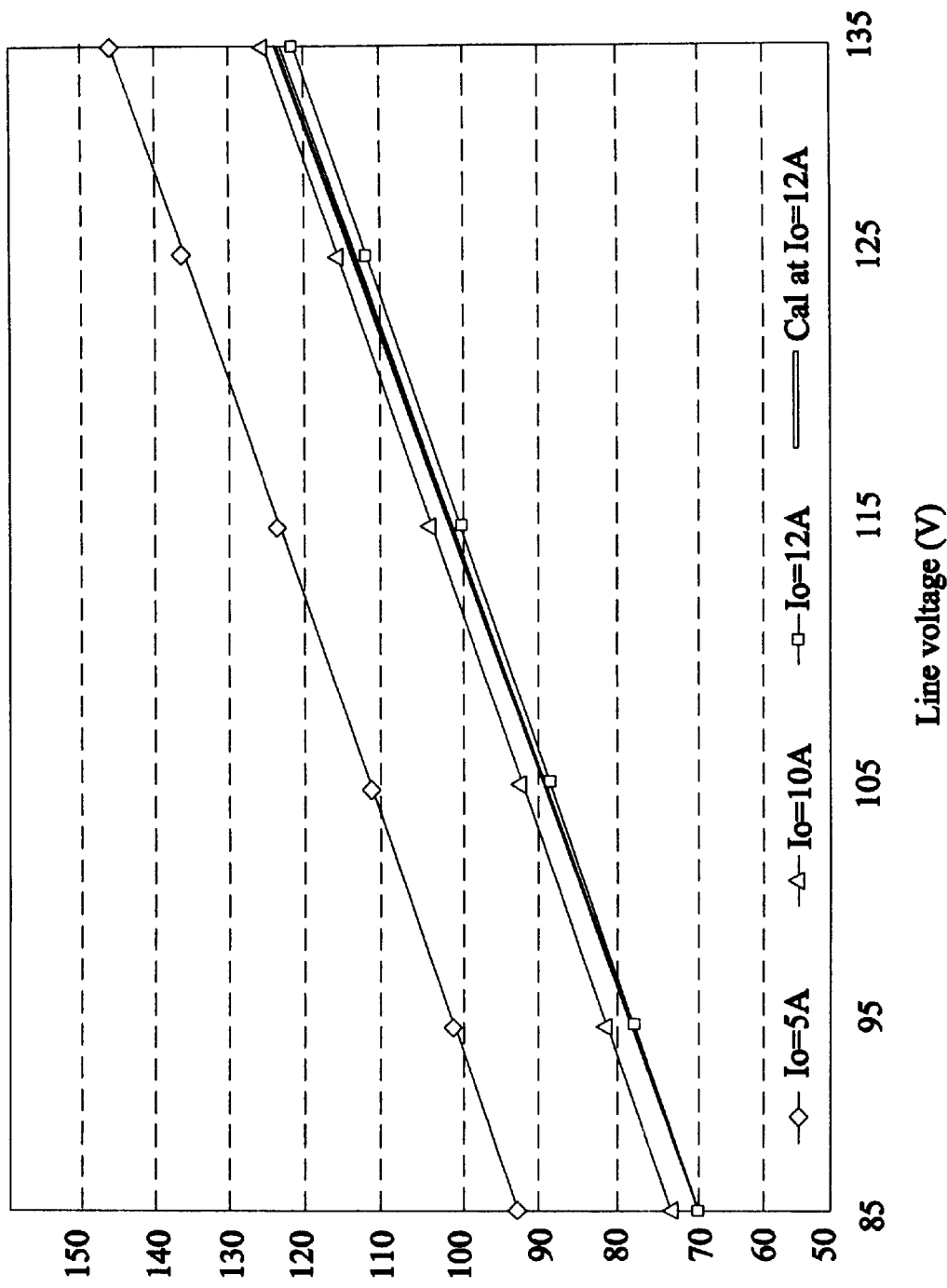
FIG. 8 shows measured storage capacitor voltage comparing with calculation at $I_0$=12A.

In the experiment, ±20% line voltage variation at 110VAC was considered. Under different load currents, input power factor and efficiency were measured and the measurements were plotted in FIGS. 6 and 7, respectively. The measured power factor at 16A load constantly maintains above 98.5%. At light load, the power factor decreased to 97% when the line voltage increased to 135V. The measured overall efficiency of the experimental prototype is around 75% at heavy load. At light load, the efficiency is more sensitive to the line voltage change. The bulk storage capacitor voltage was also monitored in the experiment. FIG. 8 gives the plot of the capacitor voltage comparing with the theoretical calculation result at 12A output current. Since the converter belongs to DCM-CCM type, the capacitor voltage increases with the load becoming light.

Novel Soft-Switching Topologies with PFC

The novel soft-switching topologies can be used at much higher switching frequencies than the hard-switching topologies with results of being useful at frequencies in the giga-hertz range with much reduced energy loss.

2) Dual Switch Converter with Soft-switching and Power Factor Corrections

Figure 9:
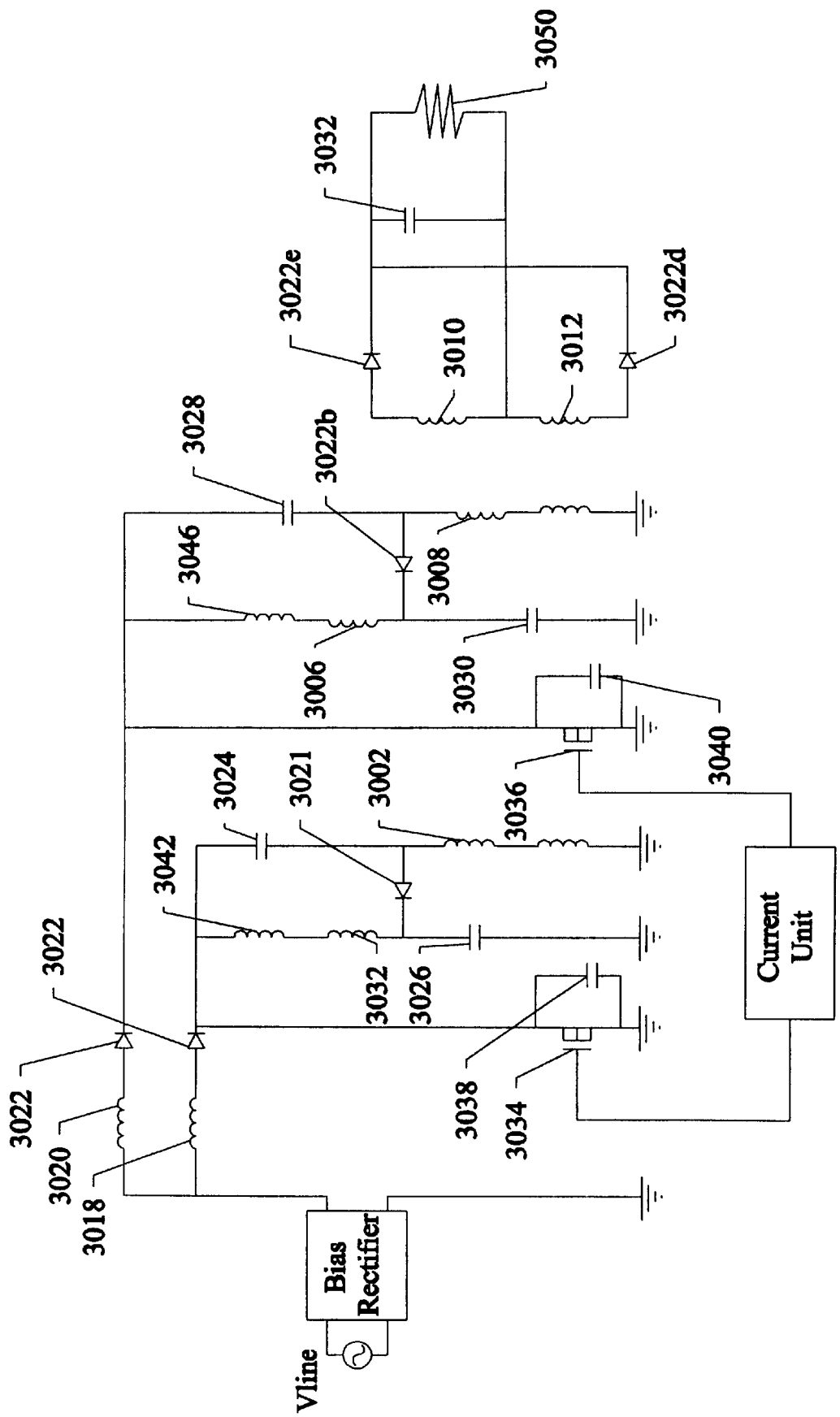
FIG. 9 is a functional schematic of the soft-switching Dual Switch converter unit with PFC and soft switching.

FIG. 9 shows the Dual Switch Converter Unit with Power Factor Correction and Soft Switching converter. The following discusses this operation of the dual switch converter unit with power factor correction (DSCL). The converter consists of a power transformer with four primary windings Lp1_A, 3002, Lp2_A, 3004, Lp1_B, 3006, and Lp2_B, 3008, and 2: isolated secondary windings Ls1, 3010, and Ls2, 2, 3012, power switches S_a, 3014 and S_b, 2, 3016 choke inductors Lchoke_A. 3018, and Lchoke_B, 3020, 6 fast rectifiers diodes, 3021 and 3022, 4 primary storage capacitors Cs1_A, 304, Cs2_A, 3026, Cs1_B, 3028, Cs2_B, 3030, and an output storage capacitor Cout, 3032. The power switches S_A, 3034 and S_B, 3036 are completed by their parasitic drain source capacitances Cds_A, 3038, and Cds_B, 3040. The parasitic leakage inductances of power transformers are represented by Ll1_A, 3042, L12_A, 3044, Ll1_B, 3046, and L12_B, 3048.

Assuming the converter operates in steady state mode. All capacitors are charged with their nominal voltages. It can be shown that here are 5 modes of operation described in their order of occurrences:

Mode 1

Lchoke_A, 3018, and Lchoke_B, 3020, are discharged and carry no current, S_A, 3034 is closed Current of Lchoke-A, 3018, increases linearly as wall as of leakage inductances Ll1_A, 30442 and L12 A, 3044 current of L11-A, 3042, and L12-A, 3044, is transformed to secondary winding Ls1, 3010, and rechargesCout, 3032, via D3, 3022c. In that mode energy from power line Vline is stored in Lchoke A, 3018, and energy from storage capacitors CsI-A, 3024, and Cs2-A, 3026, is transformed to output loop. Since S-B, 3036, is open and D1-B, 3022a, D2-B, 3022b, and D4, 3022d are reversed biased, there is no current flow in Lp1B, 3006, md Lp2-B, 3008.

Mode 2

S_A, 3034, opens and current of Lchoke-A, 3018, L11_A, 3042, L12_B, 3048 form a resonant tank, where Cds_A, 3038, until Cds_A, 3038, is charged up to voltage at storage capacitors Cs2_A, 3026, until current of leakage inductances crosses Zero. Because of D2-A Voltage across S_A, 3034, is clamped to VCs2-A, 3026, +VCs I_A, 3024. During this process voltage across leakage inductances is voltage at storage capacitors+reflected output voltage via Ls1, 3010, /LpI_A, 3002, and Ls1, 3010, /'Lp2_A, 3004 respectively. As soon as the direction of current trough leakage inductances change their sign, converter enters mode 3

Mode 3

L11_A, 3042, LI2_A, 3044, LII_B, 3046, LI2_B, 3048, Cds_A, 3038, and Cds_B, 3040, form a coupled resonant tank, where Cds_A, 3038 and Cds_B, 3040 are discharged simultaneously until Cds_B, 3040 reaches Zero. Because of body diode of Cds_B voltage across Cds-B, 3040 will not increase in negative direction. After Cds_B, 3040 is discharged completely, S_B, 3036 is turned on by the control unit and converter enters Mode 4.

Mode 4

Mode 4 operates in the same way like Mode I while primary section A and B exchange their operation. After Voltage across Cds_A, 3038, reaches Zero, converter enters Mode 5.

Mode 5 operates in the same way like Mode 3 where primary section A and B exchange there operation. If Mode 5 is completed, converter enters Mode 1 again. There are 3 possible methods to control output voltage:

Control Method I.

Output voltage is sensed, compared to a reference voltage and the resulting error controls a PWM controller that operates with a control that is smaller than switching frequency of converter. The PWM-signal switches the control unit on and off.

Control Method 2

Output voltage, 3050, is sensed and connected to a comparator that switches off as soon as output voltage is larger than a reference voltage and that switches on if sensed voltage is less than reference voltage.

Control Method 3

On time of S_A, 3034, and S_B, 3036, is controlled from Zero to maximum value, resulting in variable frequency control of converter.

Since average current of Lchoke_A, 3018, and Lchoke_B, 3020, depends next to linearly from line voltage, converter provides power factor correction.

Because voltage across power switches S_A, 3034 and S_B, 3036 are clamped to twice of storage capacitor voltage no additional snubber is required. Since both power switches operate in zero voltage-switching mode, switching losses are reduced even at frequencies above 100 kHz.

Converter operates in complementary mode where energy is transferred during both halfcycles. This reduces the size of power to a minimum.

The topology operates in a forward mode but makes use of the leakage inductance of transformer as an active part. No secondary choke inductor is required compared to classic forward converters. Multiple outputs are possible with this topology.

It should be noted that the two power switches operate at zero-voltage switching with full power transfer. As a result, this converter can operate at 50–100 KHz and possibly higher.

3) Single-Stage Soft Switching ac/dc Converter with Floating Auxiliary Switch

A new soft-switching topology is obtained by adding an auxiliary circuit to the original AC/DC converter as disclosed in FIG. 1. This original converter circuit cannot achieve high power density due to the fact that the power switch operates under hard-switching with higher than 400V drain-source voltage. In order to create a ZVS condition for the power switch, 1006, an auxiliary switch $S_a$, 1007, two resonant inductors, $L_{r1}$, 1100, and $L_{r2}$, 1100a, a resonant capacitor $C_r$, 1114, and a diode $D_r$, 1112 are introduced, shown in FIG. 5-1. To relieve the capacitive turn on loss on the auxiliary switch, low output capacitance MOSFET should be considered in selecting $S_a$.

Principle of Operation

In each switching cycle, with the auxiliary switch $S_a$ 1007, turning on a short interval of resonant takes place during which the main switch, 1006, turns on with ZVS. The cyclic operation of the proposed converter is almost the same as its hard-switching counterpart except that a resonant mode is inserted. The switching waveforms are shown in FIG. 5-2 and the switching periods are described as follows by assuming that capacitor voltages $V_{Cs1-}$ 1114=$V_{Cs2}$, 1114a=$V_{Csm}$. 1114b are constant and the line voltage, 1020, is $V_g$ in one switching cycle.

Before the auxiliary switch is turned on, the main switch, 1006, is open, and its output capacitor holds a voltage of $2V_{Cs}$. The resonant inductors carry zero current. Let's start the cyclic operation when the auxiliary switch is turned on at $t_0$.

Switching Period 1:

At $t=t_0$, the auxiliary switch $S_a$, 1007 is turned on. A resonance takes place firstly among $C_{sw}$, 1114d, $C_r$, 1114a. $L_{r1}$, 1100 and $L_{r2}$, 1100a. In order to create zero-voltage-switching condition for the main switch S, 1006, the resonant capacitance $C_r$, 1114a, must be larger than the output capacitance $C_{sw}$, 1114a, of the main MOSFET switch, i.e., $C_r/C_{SW}>1$, that in order to create zero-voltage-switching condition for the main switch S, 1006, we must design the resonant capacitance $C_r$, 1114a, to be larger than the output capacitance $C_{SW}$, of the main MOSFET switch, i.e., $C_r/C_{SW}>1$.

Switching Period 2:

With the switch voltage $v_{SW}$ decreasing to zero, diode $D_{SW}$, 1124, conducts. The input inductor L, 1002, is magnetizing in this period. The resonance continues among $C_r$, 1114a, $L_{r1}$, 1100 and $L_{r2}$, 1100a

In this period, the main switch is turned on with ZVS. This period ends when the resonant capacitor voltage reaches zero.

Switching Period 3:

With the capacitor voltage $V_{Cr}$, 1114a, resonant to zero, diode $D_r$, 1112 turns on. Since S-$L_{r2}$-$D_r$-$L_{r1}$-S forms a freewheeling loop, the resonant inductor keeps a constant current. The auxiliary switch can be turned off with zero-current-switching (ZCS) at anytime when the resonant inductor current $i_{Lr}$ becomes negative. The transformer primary windings $N_{p1}$, 1110, and $N_{p2}$, 1110a, transfer energy to its secondary $N_S$, 1110b, from energy storage capacitors $C_{S1}$, 1114, and $C_{s2}$, 1114b, respectively. The input inductor continues magnetizing, absorbing energy from the line.

Switching Period 4:

The main switch, 1006, is turned off. The switch output capacitor $C_{SW}$, 1114d is quickly charged to $2V_{Cs}$ by input inductor current $i_L$ and resonant inductor current $i_{Lr}$. Then diode $D_{21}$, 1112, starts conducting to clamp the main switch voltage. Assume the switch voltage reaches $2V_{Cs}$, with zero time. This switching period ends when both the resonant inductor current and the primary winding current reach zero. Because $L_r$, 1100, and $L_k$, 1100a, are very small, the duration of this period can be neglected.

Switching Period 5:

Input inductor, 1002, continues to demagnetize until all the magnetic energy is released to charge the storage capacitors, 1114 and 1114b.

Switching Period 6

With the input inductor decreasing to zero, diode $D_1$, 1112, turns off. All the voltages and currents remain constant. The converter is waiting for the next driving signal $S_a$ to start a new switching cycle.

Practical considerations are now noted to explain the values of the various components, which will be used in the construction of the referenced converter.

(a) To improve the input power factor and stabilize the output voltage, two higher value storage capacitors are used in the proposed converter. In steady-state operation, the storage capacitor voltages can be considered as constant. It can be shown that the higher the storage capacitor voltage the higher the input power factor can be obtained. Unfortunately, almost all the components voltage stresses are directly related to the storage capacitor voltage. In practical design, some trade off must be made.

(b) To ensure the converter operates in CCM, we must design the input inductance must be less than the critical inductance:

(c) Since there exists output capacitance in the auxiliary switch $S_a$, high peak parasitic ringing occurs during the switch is turned off, resulting in difficulty in selection of the auxiliary switch. To block the auxiliary switch voltage, the resonant tank is modified;

(d) Two resonant capacitors are used on each side of the auxiliary switch. Between each resonant capacitor and the switch, two diodes are connected to block the switch voltage at $2V_{Cs}$. The block diodes conduct only a short time in one switching cycle; so only low rating is required; and (e) Single stage soft-switching with grounded auxiliary switch To avoid the parasitic ringing of the switch, it has been determined that this is overcome by grounding of the auxiliary switch as discussed under the following 3).

3) Single Stage Soft-Switching with Grounded Auxiliary Switch

Figure 10:
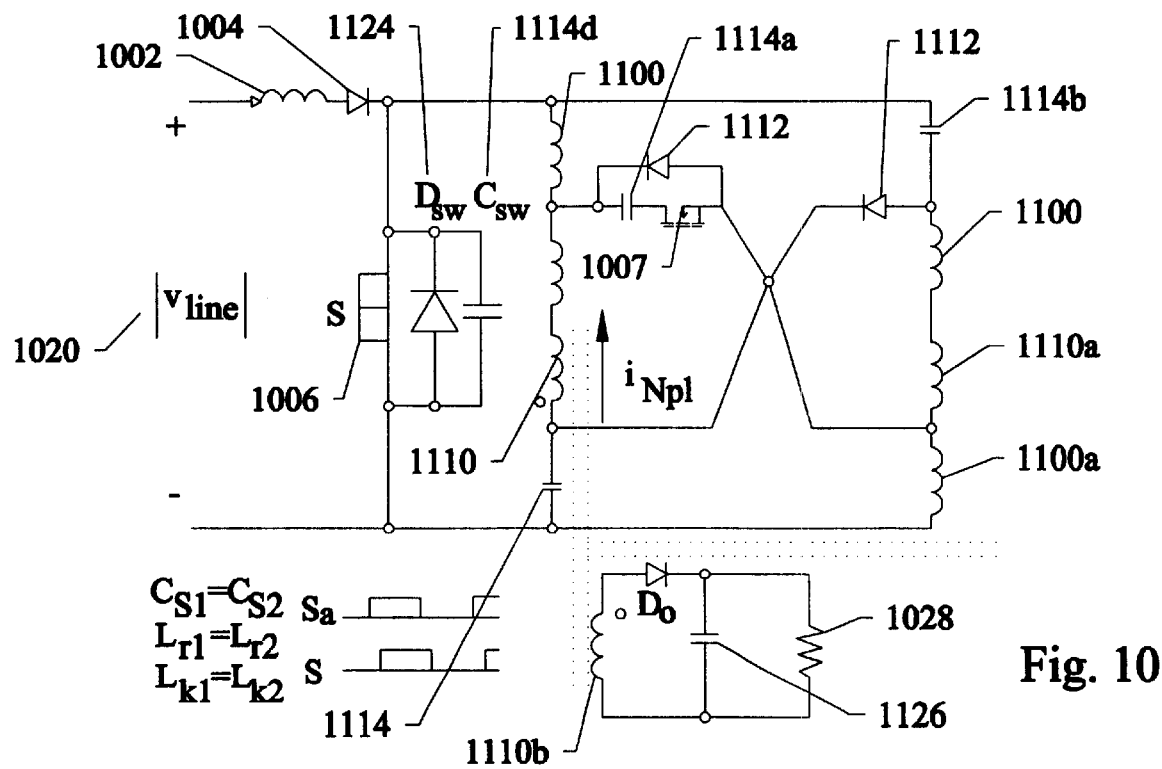
FIG. 10 shows a soft-switching PFC converter with floating auxiliary switch.
Figure 11:
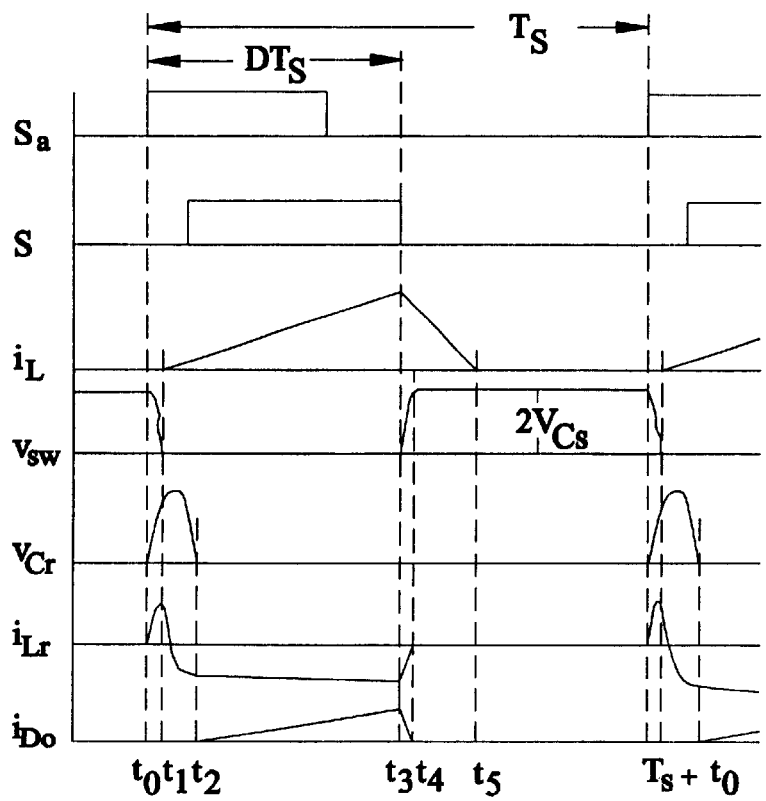
FIG. 11 shows waveforms of the soft-switching PFC converter of FIG. 10.
Figure 12:
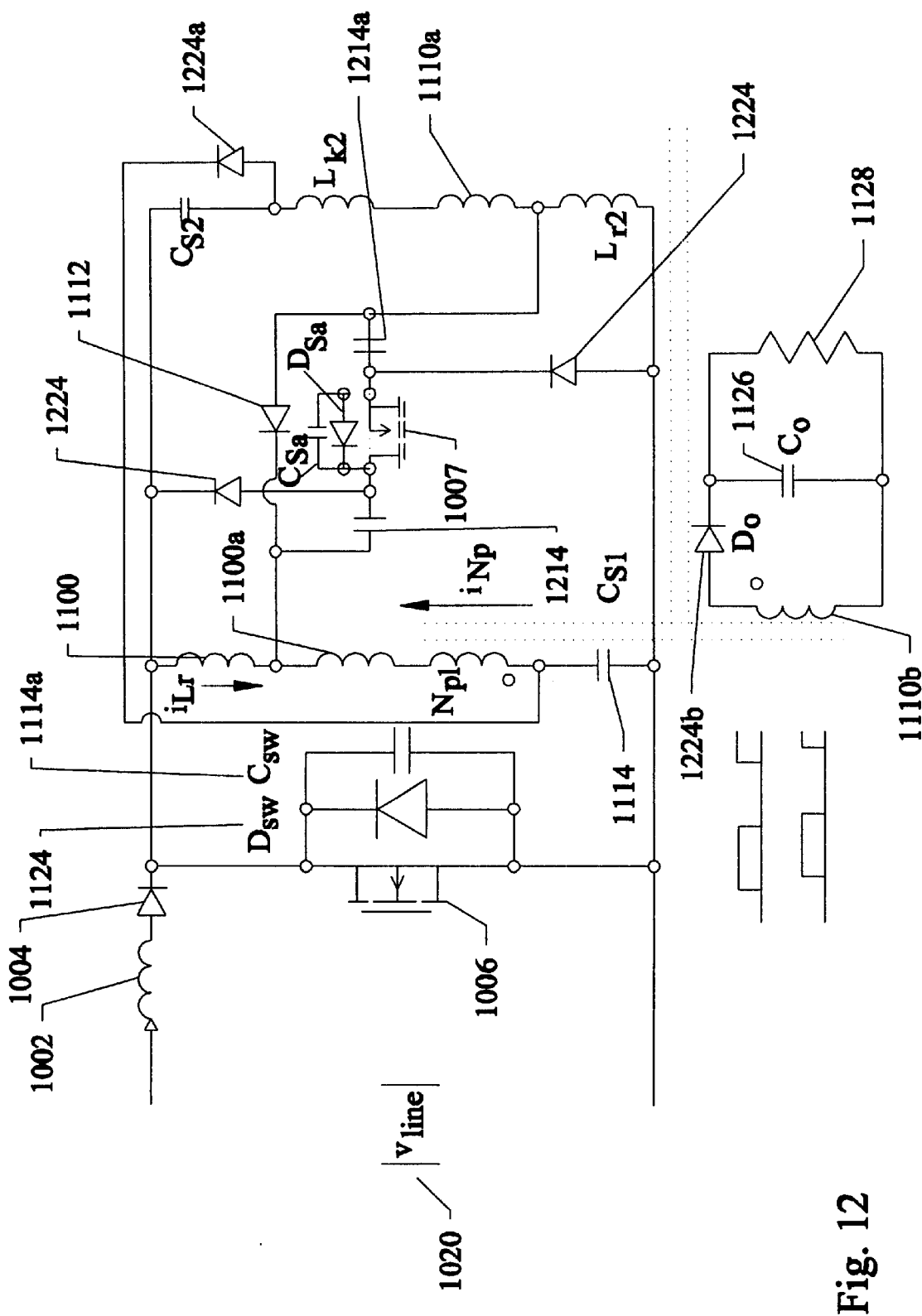
FIG. 12 shows a FIG. 10 modified with voltage clamp circuitry.

FIG. 12 shows a modified circuit of FIG. 10 by adding diodes $D_{B1}$ 1224, $C_{r1}$, 1214, and $C_{R2}$, 1214a and in which the numbering designates the components of FIG. 10 where each is common Specifications of the circuit of FIG. 12:

Nominal input voltage:   $V_{1.rms}$ = 110V @ 60 Hz;, identified as 1020.
Output voltage:   $V_0$ = 50V ± 1%;
Nominal load current:   $I_0$ = 2A;
Switching frequency:   $f_s$ = 300 kHz.

Design:

To compromise between voltage stress and regulation capabilities, we set

Transformer ratio:   n = 4:
Inductance ratio:   $k_L = L_r/L = 0.1$;
Capacitance ratio:   $k_c = C_r/C_{SW} = 1.5$;
Frequency ratio:   $f_{n1} = f_s/f_1 = 0.15$.

An experimental prototype of the soft-switching converter with voltage clamp was built in laboratory referring to the above designed parameters. The following types components are used:

Input choke L: 65 $\mu$H, 547L 55353-A2 identified as 1100.
Input diode $D_1$: DSEI60-05A identified as 1002.
Main switch S: IRFP460 identified as 1006.
Auxiliary switch Sa: IRFP460 identified as 1007.
Forward transformer T: $N_{p1}$:$N_{p2}$:$N_S$=18:18:6. Philips 3F3 E41/17/12 identified as 1110.
Storage capacitor Cs: 68 $\mu$F/380V identified as 1114.
Output capacitor Co: 470 $\mu$F/63V identified as 1126.
Resonant inductor Lr: 6 $\mu$H, LA4229 identified as 1100.
Resonant capacitor Cr: 3900 pF. CDM identified as 1214.
Diodes: D21: MUR850, identified as 1224a;Dr: MUR840, identified as 1112: Do: 25CPF16 identified as 1224b; $D_{b1}$, $D_{b2}$: UF4004 identified as 1224.
PWM IC chip: UC1825

Figure 13:
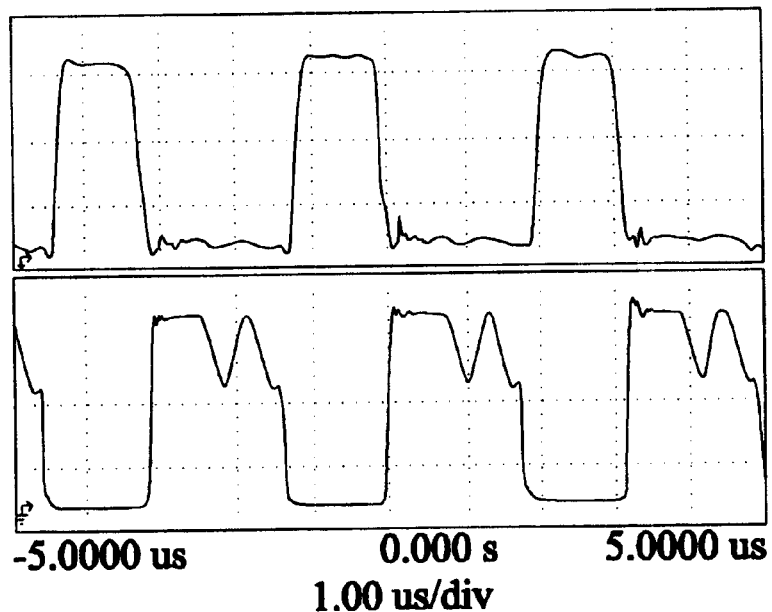
FIG. 13a shows waveforms of the soft-switching PFC converter of FIG. 12 (recorded under 110VAC input and 110W output): (a) switch waveforms (top: gate signal; bottom: drain-source voltage, 100V/div.)
FIG. 13b shows waveforms of the soft-switching PFC converter of FIG. 12 (recorded under 110VAC input and 110W output): (b) line waveforms (top: line current, 1A/div.; bottom: line voltage, 100V/div.)
Figure 13:
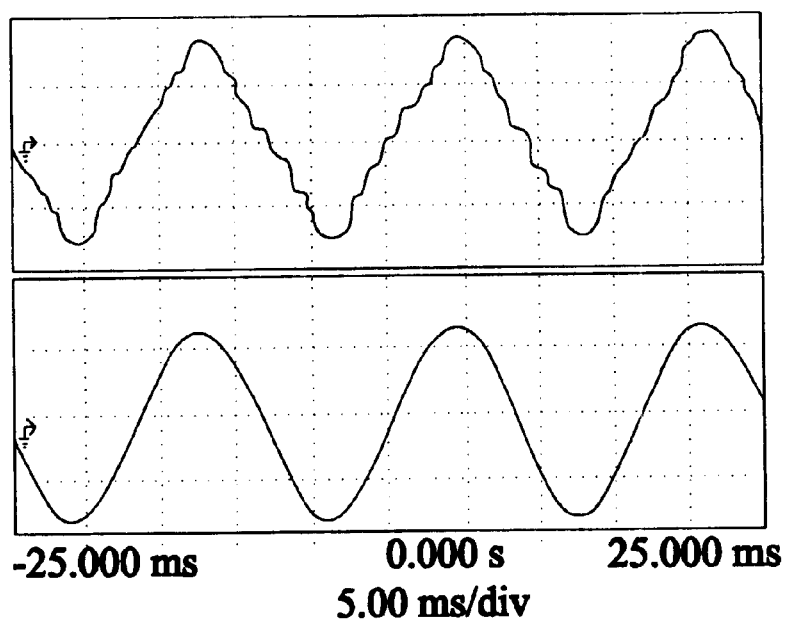

The experimental waveforms where recorded by hp54542A oscilloscope, given in FIGS. 13(a–b). FIG. 13(a) shows the switch waveforms of the main switch at the peak line voltage. It is clear that before the drive signal gated the power switch, the drain-source voltage had been brought down to zero by the resonant tank, which means zero-voltage-switching was achieved. FIG. 13(b) shows the line current comparing with the line voltage. As we can see, the line current is in phase with the line voltage. Light distortion was seen because of the use of boost type circuit at the converter's input and the affect of line filter.

Figure 14:
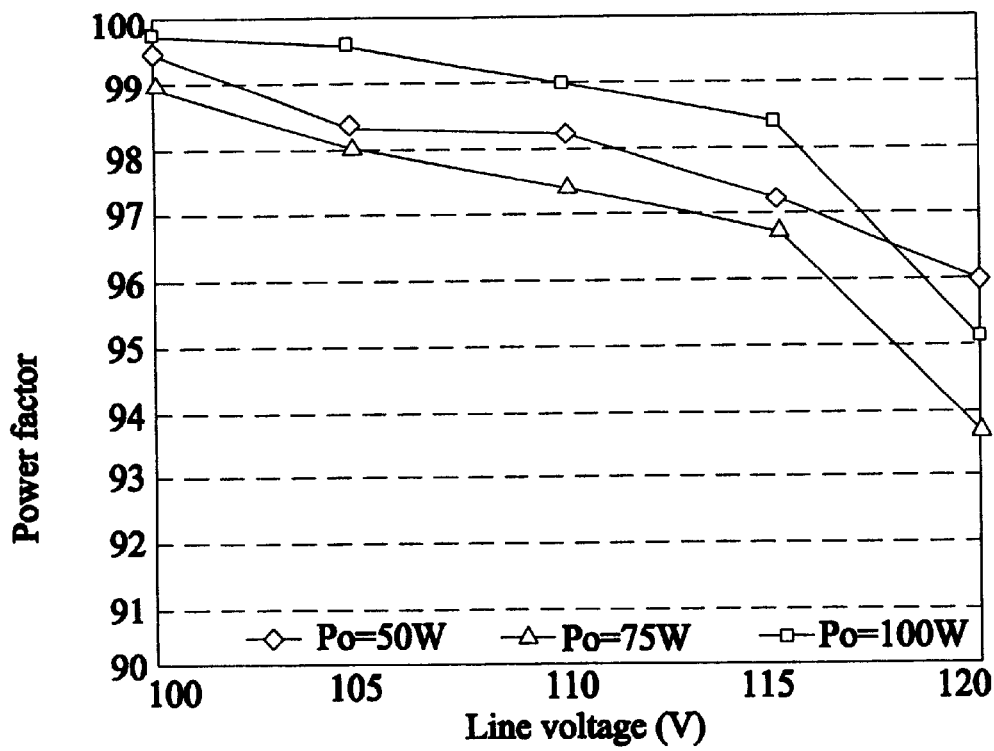
FIG. 14a shows measurements of the power factor for the converter of FIG. 12.
FIG. 14b shows measurements for the efficiency for the converter of FIG. 12.
Figure 14:
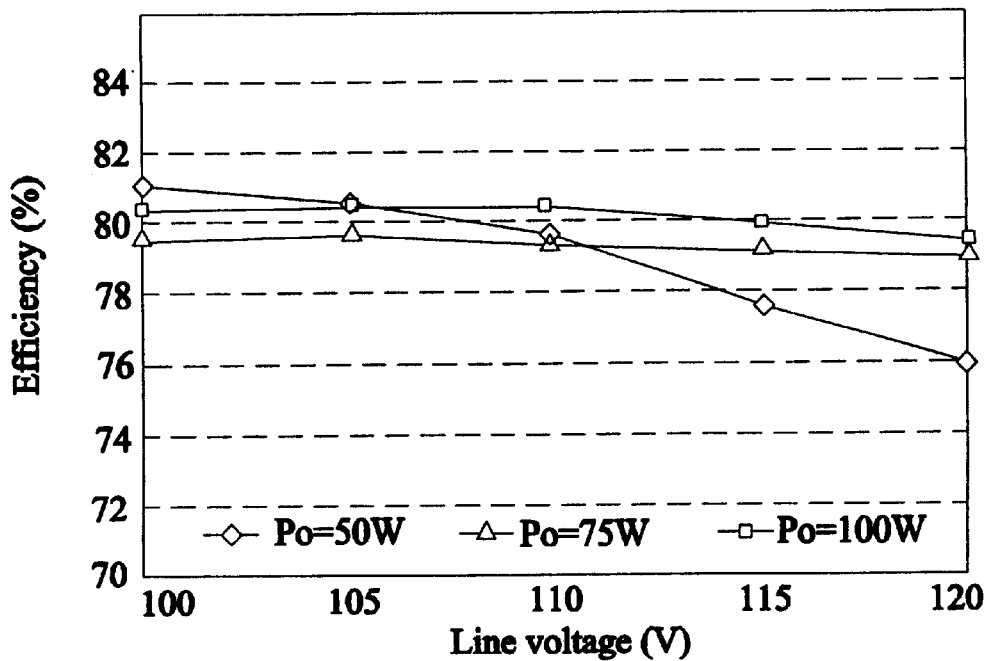

The measured power factor and efficiency are given in FIG. 14((a) and (b) respectively). Power factor higher than 93% can be ensured for output from 50W to 100W when line changes from 100V to 120V. At high load, the converter efficiency (including the line filter and the start resistor) is maintained about 80%. At light load, when the line becomes high, the efficiency decreases due to disappear of the ZVS condition.

The focus here is on eliminating some disadvantages of the previous soft-switching converter. Among the improvements to be made is make the auxiliary switch soft switching, easy to drive switches, and to use less components.

Figure 15:
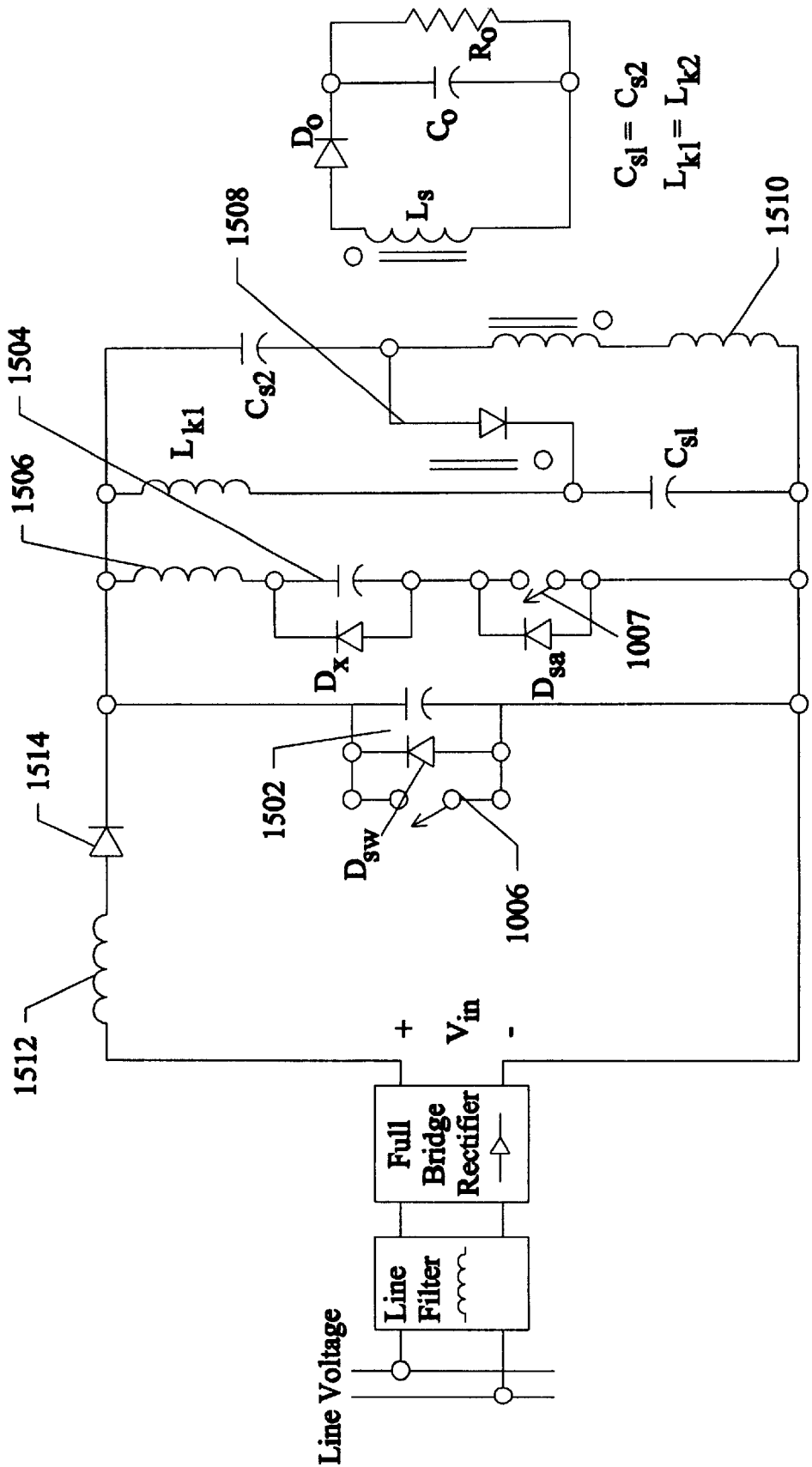
FIG. 15 shows a soft-switching PFC AC/DC converter with grounded auxiliary switches.

The second Single-Stage PFC AC/DC Converter with ZVS/ZCS operation is shown in FIG. 15. The main advantages of this converter are:

1. Both switches are soft-switching: ZVS for the main switch and ZCS for the auxiliary switch.
2. Both switches are grounded which makes them easy to control.
3. Less components.

Figure 16:
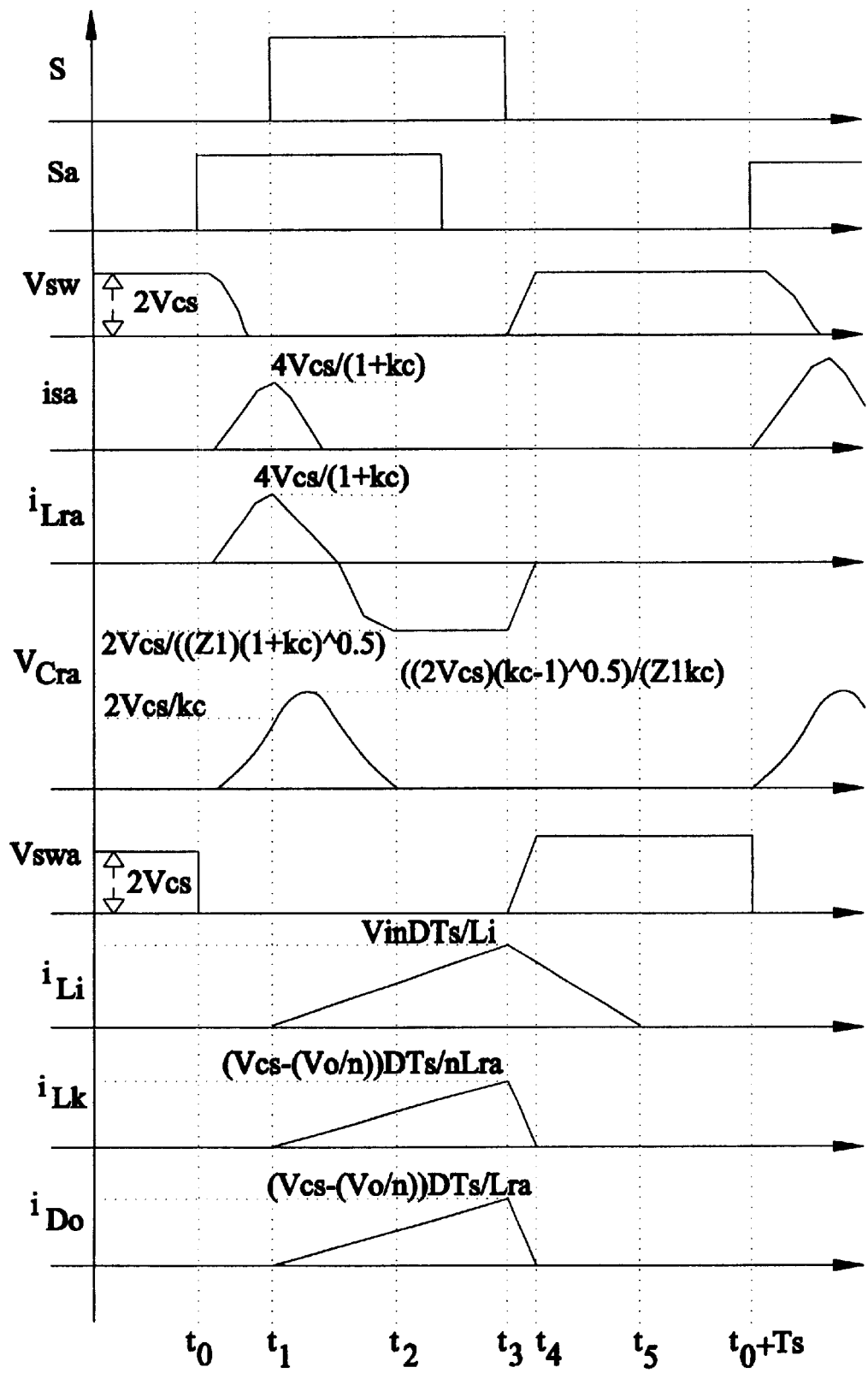
FIG. 16 shows steady-state waveforms for the converter of FIG. 15.

Principle of Operation:

The main switching waveforms and the equivalent circuits for the modes of operation are shown in FIG. 15 and FIG. 16 respectively. As can be noted, this converter has six modes of operation. Before the auxiliary switch, 1007, is turned on, the main switch, 1006, is open, and its output capacitor holds $2V_{Cs}$ where $V_{Cs1}=V_{Cs2}=V_{Cs}$. The resonant inductors carry zero current. The modes of operation start at $t_0$ and are as follows:

Mode 1 ($t_0<t<t_1$): At $t=t_0$, the auxiliary switch $S_a$, 1007, is turned on. The equivalent circuit waveform for this mode is shown in FIG. 16. $C_{sw}$, 1502, $C_{ra}$, 1504, and $L_{ra}$, 1506, form a resonant loop. At the end of this mode ($t=t_1$), the main switch (S), 1006, capacitor voltage. $V_{Csw}$, hits zero. After this time, S can be turned on at ZVS.

Mode 2 ($t_1<t<t_2$): After turning S, 1006, on at $t=t_1$, waveform, $C_{ra}$, 1504, and $L_{ra}$, 1500, resonate together until the current $i_{sa}$ through and the voltage $V_{sa}$ across auxillary switch, 1007, $S_a$ become equal to zero. Because the current through, 1007 $S_a$ is equal to zero now, $S_a$, 1007, can be turned off at ZCS. As can be noted from the switching waveforms in FIG. 16, the ZCS condition for turning $S_a$ off is available for a long period since it can be turned off anytime before turning mail switch, 1006, S off.

Mode 3 ($t_2<t<t_3$): In this mode, $V_{(ra}=0$ and the equivalent circuit for this mode is a freewheeling loop. The inductor current $i_{Lra}$ keeps constant until main switch, 1006, S is turned off at $t=t_3$.

Mode 4 ($t_3<t<t_4$): At $t=t_3$, main switch, 1006, S is turned off. The switch output capacitor $C_{sw}$, 1502, is quickly charged up to $2V_{Cs}$ by both currents $i_{L1}$ and $i_{Lra}$. The conduction of the diode $D_{link}$, 1508, clamps $V_{Csw}$ to $2V_{Cs}$. Also, $i_{Lk}=i_{Do}=0$ at the end of this mode. Because $L_{ra}$, 1506, and $L_k$, 1510, are very small, the duration of this mode can be neglected so that $t_4-t_3\approx0$.

Mode 5 ($t_4<t<t_5$) This mode starts when $D_{link}$, 1508 starts to conduct. The input inductor $L_1$, 1512 is demagnetizing during this mode until $i_{L1}$, hits zero at $t=t_5$. The equivalent circuit for this mode is shown in FIG. 47e.

Mode 6 ($t_5<t<t_0+T_s$): Because $i_{L1}=0$, $D_1$, 1514, turns off at the beginning of this mode. No changes occur for the voltages and currents during this mode until turning auxillary switch 1007 $S_a$ again initiating the next switching cycle.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A power supply that provides a DC (Direct Current) power to a load from an AC (Alternating Current) source comprising:

a rectifying stage for transferring electrical energy from an AC source into pulsating unipolar voltage pulses at output terminals;

a boost stage having a controllable conducting means and a first unidirectional conducting means for controlling current flow from the output terminals of the rectifying stage and blocking the current flow into the opposite direction and a single controllable switching device connected across the output terminals and more than one inductive-capacitive stages connected between said boost stage and a forward stage providing an inductive energy storing circuit when said switching device is closed and a capacitive charging circuit when said switching device opens whereby a conversion efficiency of over approximately 75% (seventy-five percent) AC to DC is achieved and an outlet voltage of approximately five (5) volts and lower.

2. A power supply of claim 1 wherein said more than one inductive-capacitative stages are from 2(two) to 5(five) in number.

3. A power supply of claim 1 wherein said more than one inductive-capacitive stages are 4(four) in number whereby output voltage of approximately 3.3(three-point-three) is realized.

4. An AC to DC converter with power factor correction, comprising in combination:

a power supply;

a power factor correction (PFC)circuit means;

an AC to DC power conversion circuit means connected to the PFC circuit means; a step-down switched capacitor network; and, a power on and off switch and an on and off auxiliary switch for controlling both the PFC circuit means and the AC to DC power conversion circuit means, wherein the converter operates at an efficiency of greater than approximately 80% (eighty percent) and at a frequency of greater than about 500 (five hundred) kilo-hertz.

5. The power supply of claim 4 wherein the auxiliary switch is grounded.

6. The power supply of claim 4 wherein both of said switches each have a resonant capacitor and a blocking diode whereby the switch voltage is blocked.

7. The power supply of claim 4 wherein the controllable conducting mean, which operates with a switching frequency, is greater than approximately 500(five hundred) kilo-hertz.

8. The power supply of claim 4 wherein a ratio between on and off time of said controllable means is controlled by: means for sensing at least one of voltage and current of the power supply.

9. The power supply of claim 5 wherein the ratio between on and off time of said controllable conducting means is also controlled by: a sensed overload of the power supply.

10. The power supply of claim 5 wherein the ratio between on and off time of said controllable conducting means is further controlled by: an external source chosen from one of:

a voltage; and current.

* * * * *